United States Patent Office 2,719,456
Patented Oct. 4, 1955

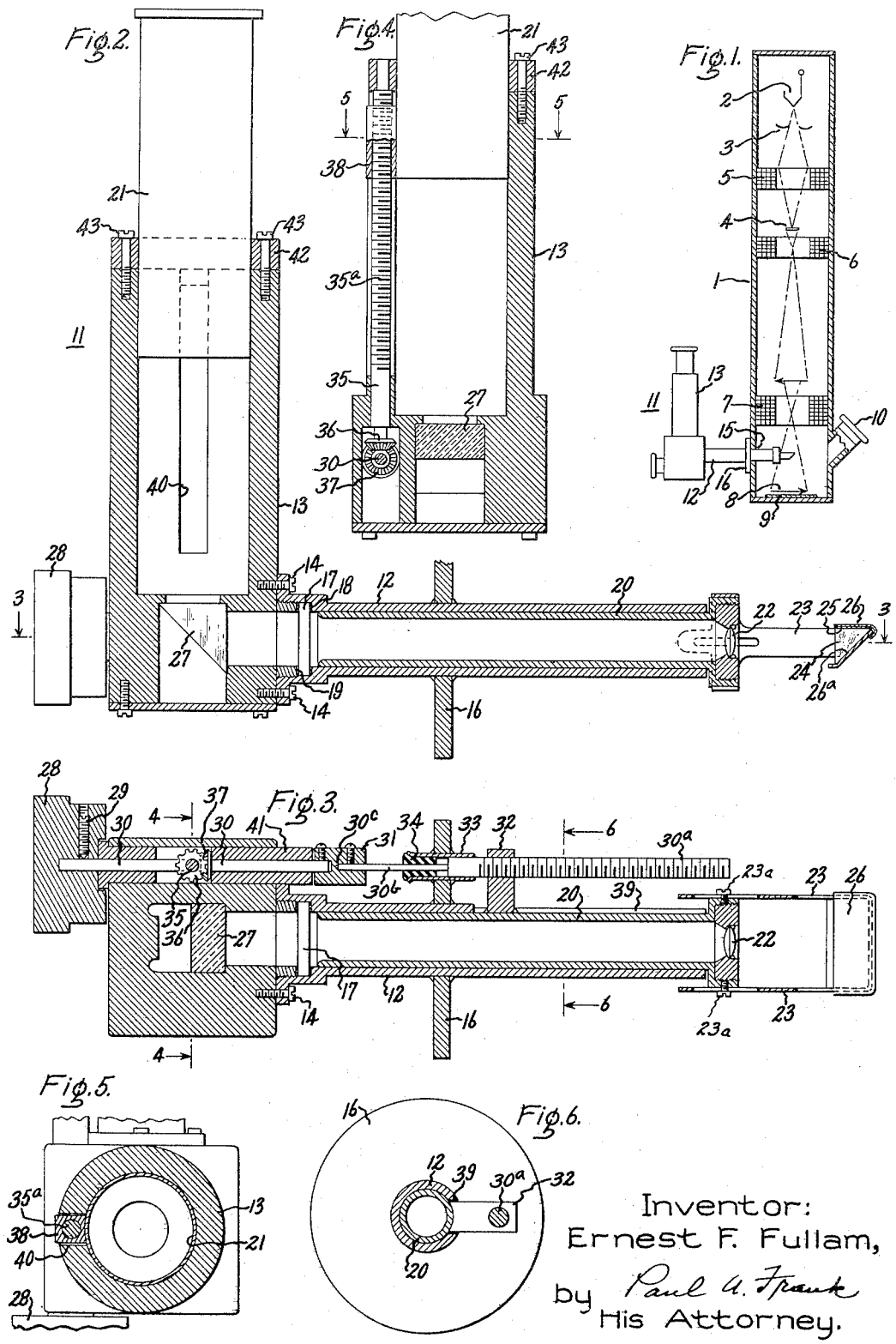

2,719,456

IMAGE SCANNING AND MAGNIFYING MICROMETER

Ernest F. Fullam, Schenectady, N. Y., assignor to General Electric Company, a corporation of New York Application February 2, 1952, Serial No. 269,669

7 Claims. (Cl. 88—39)

This invention relates to image scanning and magnifying micrometers and more particularly to an optical system which is adapted for use in conjunction with high energy radiation devices and which is readily adjustable to afford proper focus and the desired magnification of images formed by such devices.

In microscopes and diffraction apparatus of both the electron and X-ray types, it is frequently necessary to take a number of photographic exposures and to make a number of adjustments in the instrument before suitable calibration thereof is achieved. Such a procedure is time-consuming and generally undesirable. Obviously, some arrangement for viewing a specimen directly and for magnifying certain areas thereof and measuring accurately structures within the magnified area would be desirable and would save considerable time, for example, in the magnification calibration of electron microscopes.

A principal object of this invention is to provide an optical system for use primarily as an image-measuring means for high energy radiation devices.

Another object of this invention is the provision of an improved means for quickly calibrating high energy radiation image forming magnifying devices.

In accordance with the invention, an optical system is provided for use in conjunction with radiation devices of the evacuated enclosure type wherein a hollow structure having a pressure-tight light-transmitting closure member therein is disposed in an opening in a wall of the enclosure and arranged in pressure-tight relation thereto, and a tubular member is arranged in telescoping relation on each of two extremities of the hollow structure so as to define an optical path through the enclosure wall. Means for moving the inner one of the members telescopically in order to afford scanning of an image formed within the enclosure is also arranged to move the other tubular member a corresponding distance so as to maintain a constant length of the optical path.

The invention will be better understood from the following description taken in conjunction with the accompanying drawings, in which Fig. 1 is a cross-sectional view of an electron microscope equipped with the improved optical system comprising the invention, Fig. 2 is an enlarged side view in cross-section of an optical system embodying the invention, Fig. 3 is a cross-sectional view along the line 3—3 of Fig. 2, Fig. 4 is a cross-sectional view along the line 4—4 of Fig. 3, Fig. 5 is a cross-sectional view along the line 5—5 of Fig. 4, and Fig. 6 is a cross-sectional view along the line 6—6 of Fig. 3.

While the invention is shown in the drawing and described hereinafter as being applicable to a microscope of the electron type, it will be understood that the invention is not limited thereto and may be applied to a miscroscope of the X-ray type. Furthermore, the principles of the invention are also applicable to diffraction apparatus of both the X-ray and electron types, as well as to other high energy radiation devices.

The microscope shown in Fig. 1 comprises an evacuated enclosure schematically represented by the numeral 1, in which is disposed a cathode 2 and an anode 3. As is well understood by those skilled in the art, a potential applied between the cathode 2 and the anode 3 causes a stream of electrons to be directed toward the anode 3. Since the anode 3 is provided with an opening, some of the electrons pass through the opening as indicated by the dotted lines and are directed toward a specimen 4 by means of a condenser lens 5. Further modification of the radiation is effected by means of the objective lens 6 and the projection lens 7 so as to produce an image of the specimen at 8 on a recording or viewing screen 9. Access to the screen 9 is afforded by means of the viewing port 10. As is well understood in the art, the screen 9 could be a photographic plate or could be a fluorescent screen on which the image is formed.

For the purpose of examining a portion of the image minutely, and also for the purpose of scanning and measuring particular structures forming parts of the specimen, the optical device generally designated by the numeral 11 is provided in accordance with the invention. Device 11 may find application as a calibrating means for calibrating the electron miscroscope, or for calibrating other similar devices, or the optical device 11 may be useful merely for the purpose of magnifying and scanning certain areas of the specimen and for other purposes.

As is indicated in Fig. 2, the device 11 comprises a hollow enclosing structure formed in two parts. The hollow enclosing structure comprises a horizontally disposed part 12 and a vertically disposed part 13 which are secured together by means of the bolts 14. Part 12 is disposed within an opening 15 formed in a wall of the evacuated enclosure 1. A flange 16 secured to the part 12 is provided with openings, not shown, through which screws are inserted to affix the device 11 in position. It will be understod that the hollow enclosing structure comprising the parts 12 and 13 could be a straight continuous structure, i. e., the part 13 could be disposed coaxially with respect to the horizontally disposed part 12, if desired. As shown by the drawings, the part 13 is disposed at a right angle with respect to the part 12 so as to render the structure more accessible to the operator. It will be understood that the part 12 is disposed within the opening 15 and is arranged in pressure-tight relation thereto so as to prevent the flow of air into the evacuated enclosure 1.

For the purpose of preventing the leakage of air through the parts 12 and 13, a closure member 17 is disposed within the part 12 in pressure-tight relation thereto. The pressure-tight construction is achieved by means of a pair of gaskets 18 and 19, which are tightly fitted on either side of the closure member 17. The closure member 17 is constructed of light transmitting material such as glass.

Disposed within the part 12 is a telescopic member 20. Another telescopic member 21 is arranged within the part 13. Mounted at the right-hand end of the member 20 is an objective lens 22 and a pair of support members 23 secured to and movable with the telescopic member 20. The support members 23 are for the purpose of holding a prism 24 in a fixed position relative to the objective lens 22. A screen of fluorescent material 25 is mounted on the upper surface of the prism 24, and a thin coating of aluminum or other suitable low density substance 26 affixed over the fluorescent material 25 to ground the static charge otherwise built up on the fluorescent screen under electron bombardment and to enhance the image brightness. If desired a coating of aluminum 26a may be deposited on the lower surface of the prism 24.

With the device 11 arranged in the position shown in Fig. 1, a portion of the image formed by the electron microscope will appear as an object on the fluorescent screen 25. This object, by means of the action of the prism 24, will be transmitted through the objective lens 22 and the closure member 17. By virtue of the prism 27, the object is diverted upwardly through the member 13 and the telescopic member 21 to an eye-piece lens, which may contain either a micrometer scale or a cross hair as a reference mark, disposed within the upper portion of the member 21 and which is not shown in the drawing.

As is well known, the object distance, i. e., the distance between the fluorescent screen 25 down to the surface 26a in the prism 24, and thence to the objective lens 22, must bear a predetermined relation to the image distance, i. e., the distance from the objective lens 22 to the prism 27, and thence to the eye-piece disposed within the upper portion of the tubular member 21. Since the distance between the prism 24 and the objective lens 22 is fixed as determined by the adjustment of the support member 23 by means of the screws 23a, the member 21 is moved telescopically with respect to the member 13 whenever the telescopic member 20 is moved telescopically with respect to the horizontal part 12 so as to maintain a constant image distance.

For the purpose of imparting motion to the members 20 and 21 which is compensating, a micrometer device 28 provided with suitable measuring scale, not shown, is affixed by setscrew 29 to rotatable shaft means 30. Shaft means 30 is rigidly coupled to the threaded portion 30a by means of the connecting block 31. Threaded portion 30a of the shaft 30 is cooperatively related with the threads of the projection 32, which is secured to the tubular member 20. A seal for the shaft 30 is provided in the form of a tubular structure 33, and an extension 30b of threaded shaft 30a disposed within the packing material 34. Preferably material 34 is a silicone material capable of wetting the sealing surfaces of the tubular member 33 and of the shaft extension 30b. Extension 30b is pointed, as is indicated at 30c, so as to enable the projection 30b to be forced through the silicone material 34 thereby to afford a vacuum tight sealing construction. Thus rotation of micrometer device 28 imparts rotary motion to the shaft 30 including the threaded portion 30a thereof, thereby to cause transverse movement of the tubular member 20, which movement in turn enables an operator to scan the image produced in the electron microscope. Axial movement of shaft 30 is prevented due to the fact that the gear 37 and block 31 are affixed to the shaft on opposite sides of the fixed journal support member 41. Shaft 35 is captured between its gear 36 which is in engagement with gear 37 and the stop member 42 secured to part 13 by bolts 43.

For the purpose of imparting a corresponding movement to the tubular member 21 such as is imparted to the tubular member 20, the shaft member 35 and gear 36 cooperate with gear 37 secured to and rotatable with the shaft 30. As is indicated in Fig. 4, the shaft 35 is provided with a threaded portion 35a which cooperates with a threaded projection 38 formed integrally with the tubular member 21.

For the purpose of accommodating motion of the projections 32 and 38 formed respectively on the tubular members 20 and 21, the slots 39 and 40 are respectively provided in the parts 12 and 13. It will be understood that, if desired, the tubular members 20 and 21 could be disposed outside of the associated parts 12 and 13, and the slotted construction such as is shown at 39 and 40 would not be necessary. Either type of construction is deemed within the province of the invention.

While I have shown and described particular modifications of the invention, I do not wish to be limited thereto and intend in the appended claims to cover all changes and modifications as fall within the true spirit and scope of the invention.

What I claim as new and desire to secure by Letters Patent of the United States is:

1. An optical system comprising a hollow enclosing structure, a pair of tubular members arranged in telescoping relation with the extremities of said hollow structure, one of said tubular members carrying an objective lens and the other of said tubular members comprising an eye-piece ocular which define an optical path of a given length therebetween, and micrometer means operatively related with each one of said pair of tubular members and effective to impart measured movement to each of said pair of members, the movement of one of said members being such as to compensate for movement of the other of said members thereby to maintain a constant length of said optical path.

2. An optical system comprising a hollow enclosing structure, a pair of tubular members arranged in telescoping relation with the extremities of said hollow structure, one of said tubular members carrying an objective lens and the other of said tubular members comprising an eye-piece ocular which define a magnifying optical path of a given length therebetween, a threaded projection on each of said members, and threaded rotatable shaft means secured against axial movement and arranged with the threads thereof in cooperative relation to the threads of said projections, rotation of said shaft means being effective to impart substantially equal telescoping movement to said members so as to maintain a constant length of said optical path.

3. An optical system for use in conjunction with an evacuated enclosure, said system comprising a hollow enclosing structure extending through an opening in a wall of said enclosure and arranged in pressure-tight relation thereto, a closure member disposed within said structure intermediate the extremities thereof and arranged in pressure-tight relation thereto, said closure member being constructed of a material capable of transmitting light, a pair of tubular members arranged in telescoping relation with the extremities of said hollow structure and defining therewith an optical path forming a portion of said system, and adjustable means operatively related with each one of said pair of tubular members and effective to impart measured movement to said pair of members.

4. An optical system for use in conjunction with an evacuated enclosure, said system comprising a hollow enclosing structure extending through an opening in a wall of said enclosure and arranged in pressure tight relation thereto, a closure member disposed within said structure intermediate the extremities thereof and arranged in pressure-tight relation thereto, said closure member being constructed of a material capable of transmitting light, a pair of tubular members arranged in telescoping relation with the extremities of said hollow structure and defining therewith an optical path of a given length, micrometer means operatively related with each one of said pair of tubular members and effective to impart measured movement to said pair of members, the movement of one of said members being such as to compensate for movement of the other of said members, thereby to maintain a constant length of said optical path.

5. An optical system for use in conjunction with an evacuated enclosure, said system comprising a hollow enclosing structure extending through an opening in a wall of said enclosure and arranged in pressure-tight relation thereto, a closure member disposed within said structure intermediate the extremities thereof and arranged in pressure-tight relation thereto, said closure member being constructed of a material capable of transmitting light, a pair of tubular members arranged in telescoping relation with the extremities of said hollow structure and defining therewith an optical path forming a portion of said system, adjustable means operatively related with each one of said pair of tubular members and effective to impart measured movement to said pair of members, said adjustable means extending through an opening in a wall of said enclosure and being arranged in pressure-tight relation thereto.

6. An optical system for use in conjunction with an evacuated enclosure, said system comprising a hollow enclosing structure extending through an opening in a wall of said enclosure and arranged in pressure-tight relation thereto, a closure member disposed within said structure intermediate the extremities thereof and arranged in pressure-tight relation thereto, said closure member being constructed of a material capable of transmitting light, a pair of tubular members arranged in telescoping relation with the extremities of said hollow structure and defining therewith an optical path of a given length, a threaded projection on each of said members, threaded rotatable shaft means secured against axial movement and arranged with the threads thereof in cooperative relation to the threads of said projections, rotation of said shaft means being effective to impart substantially equal telescoping movement to said members so as to maintain a constant length of said optical path, said shaft means extending through an opening in a wall of said enclosure and being arranged in pressure-tight relation thereto.

7. An optical system for use in conjunction with an evacuated enclosure in which an object forming device is disposed, said system comprising a hollow enclosing structure extending through an opening in a wall of said enclosure and arranged in pressure-tight relation thereto, a closure member disposed within said structure intermediate the extremities thereof and arranged in pressure-tight relation thereto, said closure member being constructed of a material capable of transmitting light, a pair of tubular members arranged in telescoping relation with the extremities of said hollow structure and defining therewith an optical path of a given length, an objective lens mounted on the one of said members extending into said enclosure, support means movable with said one of said members and supported thereby for positioning said object forming device at a given object distance from said objective lens, an eye-piece lens mounted on the other of said members, and adjustable means operatively related with each of said tubular members and effective to impart measured telescoping movement to said members, the movement of said one of said members being compensated by a corresponding movement of the other of said members so as to maintain a constant image distance between said objective and eye-piece lens.

References Cited in the file of this patent

UNITED STATES PATENTS

| | | |
|---|---|---|
| 914,838 | Von Hofe | Mar. 9, 1909 |
| 1,524,089 | Eppenstein | Jan. 27, 1925 |
| 2,115,626 | French | Apr. 26, 1938 |
| 2,164,747 | Landis | July 4, 1939 |
| 2,165,341 | Capstaff et al. | July 11, 1939 |
| 2,286,977 | Richards | June 16, 1942 |